UNITED STATES PATENT OFFICE.

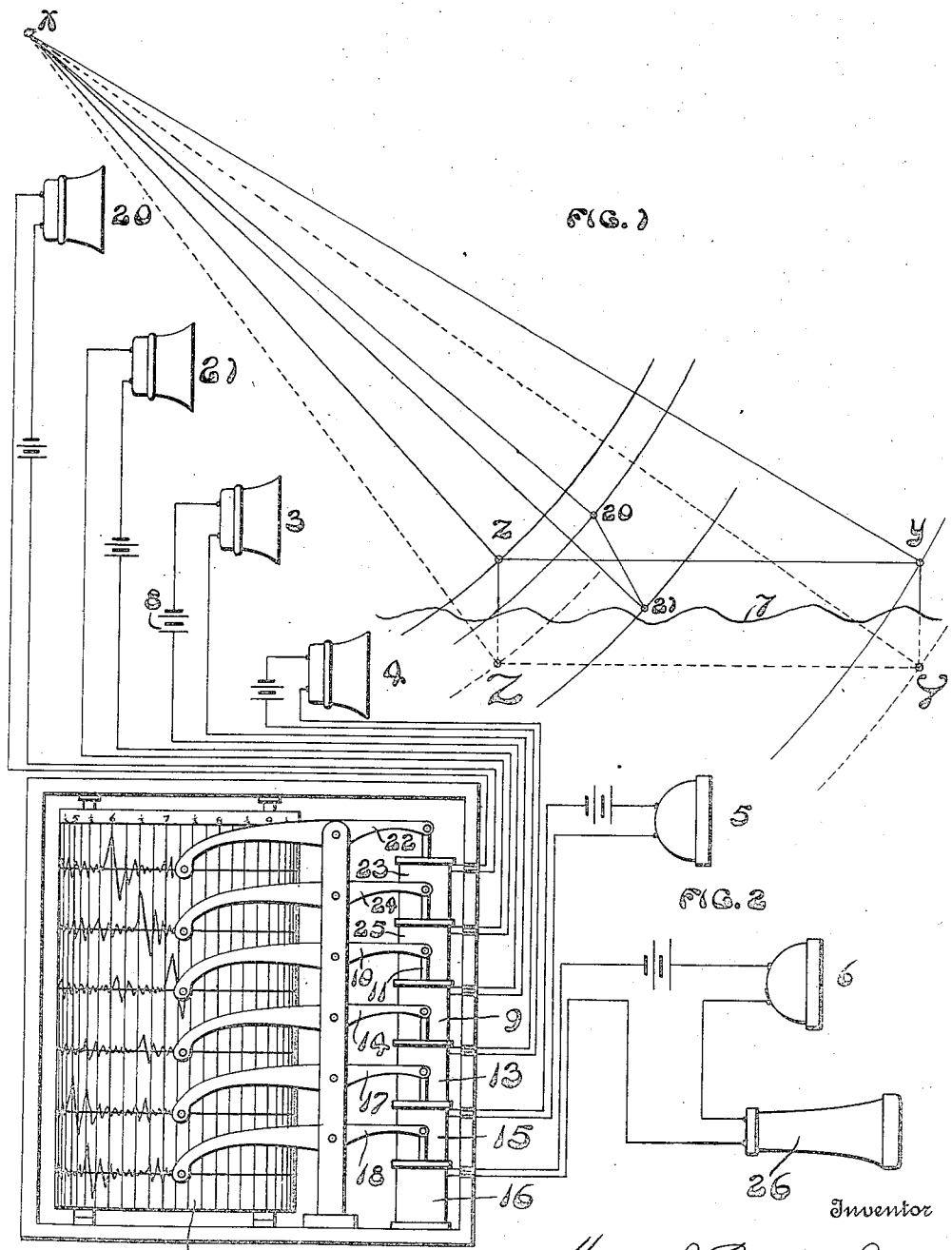

HENRY J. FURBER, JR., OF CHICAGO, ILLINOIS.

APPARATUS FOR ASCERTAINING THE RELATIVE LOCATIONS OF DISTANT POINTS.

1,194,376.  Specification of Letters Patent. Patented Aug. 15, 1916.

Application filed March 8, 1911. Serial No. 613,014.

*To all whom it may concern:*

Be it known that I, HENRY J. FURBER, Jr., a citizen of the United States of America, and resident of Chicago, county of Cook, and State of Illinois, have invented certain new and useful Apparatus for Ascertaining the Relative Locations of Distant Points, of which the following is a specification.

An object of this invention is to produce a new and improved system of signaling, for the purpose of ascertaining the location of a source of sound, relatively to established and invisible points.

A further object is to produce a system of signal sending and receiving apparatus which is capable of being employed in accurately determining the relative positions of distant points.

A further object is to produce means for receiving vibrations or waves propagated through two media, and means operating in connection with the receiving means, for providing data which may be employed in connection with the velocity of travel of the vibrations in the different media, in determining the position of the source of vibrations, relatively to the receiving means.

In my invention I utilize the principle that vibrations or waves are propagated at different velocities in different transmitting media, and that consequently, vibrations simultaneously emitted in two media will arrive at established points at different times.

In carrying out my invention I determine the respective moments that vibrations, emitting simultaneously from some source of vibratory impulse and traveling in different media, reach different established points located a known distance apart and in known positions, with relation to each other, and I then employ this data in determining the relative positions of the established points and the source of vibratory impulse.

In the drawings accompanying and forming a part of this application, Figure 1 is a geometric diaphragm graphically illustrating the principles employed in the mathematical computations utilized in determining the distances and direction of the source of sound from established points. Fig. 2 is diagrammatic view of apparatus embodying my invention, and employed in recording the time that sound is received at different established points in different media.

Apparatus embodying my invention is adapted to be employed in connection with a source of vibratory impulses, which is capable of propagating vibrations in two media. The vibrations emitted by the source in the two media may be of the same character, or they may have essentially different characteristics and be propagated, because of their characteristics, in one or another medium, independently of the location of the source. For example, the source may emit sound waves which will propagate in the air and also in water, or in some other dense medium; or the source may emit Hertzian waves and sound waves, which, because of their characteristics, are respectively propagated in the ether and in the air, or some other ponderable medium.

The apparatus illustrated as an embodiment of my invention, includes two sound receivers, 3 and 4, which may be similar in construction to ordinary telephone transmitters, and two receivers, 5 and 6, which are preferably located directly beneath the respective receivers, 3 and 4, and are submerged in water, which forms a transmitting medium of sound. The receivers, 3 and 4, are located in the air, as indicated at $y$ and $z$, in Fig. 1, and at a known distance apart. The positions of the receivers, 5 and 6, are indicated at Y and Z, in Fig. 1, and are located below the surface of the water, as indicated by the wavy line 7 in Fig. 1. Each receiver, 3 and 4, preferably consists of a diaphragm, not shown, and a variable electrical resistance, not shown. The diaphragm is adapted to vibrate in response to vibrations emanating from a source of sound, and to vary the resistance in an electric circuit, in response to the vibrations or sound waves.

In the drawings, receiver 3 is shown located in an electric circuit, provided with a source of constant potential, such as a battery 8 and a solenoid 9, which controls a magnetically actuated diaphragm, not shown. The variations in the resistance, forming a part of the receiver 3, cause variations in the current-flow, through the circuit, and, consequently in the magnetism of the solenoid. This causes the magnetically actuated diaphragm to vibrate in response to vibrations of the receiver diaphragm. The magnetically actuated diaphragm actuates a pivotally mounted recording arm 10, through the agency of a link 11, and the arm is provided at its free end with a pen, which may bear against a moving strip of paper 12, graduated to indicate time units, such, for example, as seconds, and fractions of seconds. The strip of paper 12 is driven at a uniform, determined speed, by means of a clock mechanism, not shown. The purpose of the apparatus described, is to record on the strip 12 the time that sound from any source reaches the receiver 3. The receiver 4 is located in a similar electric circuit, which includes a solenoid 13. The solenoid actuates a recording arm 14, through the agency of a magnetically actuated diaphragm, not shown.

The receivers, 5 and 6, are similar to the receivers, 3 and 4, but are adapted to vibrate in response to sound waves or vibrations transmitted through water. Each receiver is located in an electric circuit, and the receivers, 5 and 6, respectively, control solenoids, 15 and 16, which in turn respectively actuate recording arms, 17 and 18, by means of mechanically actuated diaphragms, as has been described. Each arm, 14, 17 and 18, is provided at its free end with a recording pen, which bears against the moving strip of paper 12, and the arms are located one above the other, so that the same graduating line on the strip passes simultaneously under each of the arms.

The vibrations of the receiving diaphragms caused by a sound will vary in accordance with the characteristics of the sound waves, and the vibrations of the receiving diaphragms will cause corresponding vibrations in the magnetically controlled diaphragms. Under these conditions, the free ends of the recording arms will reciprocate in response to the vibrations of the receiving diaphragms, and the amplitude of their reciprocations will vary with the character of the sound received by the receivers. The recording arms 10, 14, 17 and 18 will be constantly vibrating, if the receivers and the magnetically actuated diaphragms are sufficiently sensitive, and they will consequently trace zig zag or wavy lines on the strip. Each sound to which the receivers are subjected will cause characteristic vibrations of the arms and there will always be points of maximum and minimum vibrations, depending upon the character of the sound. These points of maximum and minimum vibrations may be readily distinguished on the strip 12. The difference in time between the reception of such a maximum or minimum vibration by one of the receivers, located in the water, and the other located immediately above it in the air, will be readily indicated on the strip, and can be determined by measurements or by the graduations on the strip, and this will determine the difference in time it takes vibrations occasioned by a single vibratory impulse to travel through the different media.

One feature of my invention consists in determining the relative position of a source of vibratory impulses and the receivers 3 and 4 or 5 and 6. The source may be provided with apparatus of any suitable character capable of emitting vibrations in two media or vibrations of different character. With receivers sensitive to sound vibrations, the source will be equipped with apparatus capable of emitting sound waves in the atmosphere and also in water. The apparatus above described is employed in determining the difference in time it takes sound waves emanating from a source of unknown location, to reach the receivers located in the air and in the water, and then in computing the direction and the distance of the point of origin or source of the sound. In Fig. 2, $x$ indicates the source or origin of the sound waves, which are propagated in the two media.

Referring to Fig. 2: Sound emanating from a source of unknown location, such as X, travels in the air at a known velocity, which, for my purposes, may be designated by $a$, and it travels in the water at a known velocity, which may be designated by $w$; then letting $d$ equal the difference in the time it takes the sound to reach the receiver located in the air, for example the receiver 3, and the receiver located in the water, directly below the receiver 3, for example, the receiver 5, and substituting the known values in the following equation, the length of $xy$ may be determined.

$$XY = da + \frac{da}{w-a}$$

I arrive at the equation $$XY = d\left(a + \frac{a^2}{w-a}\right),$$

as follows:—XY is the unknown distance from the origin of a sound to the point of incident, or where it is received. It is this distance I seek to establish. Now, let "$a$" represent the velocity of sound through air. Let "$w$" represent the velocity of sound through water. Let "$d$" represent the time which elapses between the arrival at Y of a sound originating at X through the media respectively of air and water, or, in other words, the time between the two detonations.

If sound travels in water at the rate of "$w$" feet per second and through air at the rate of "$a$", the sound in water would in one second outstrip the sound in air by a distance of "$w-a$" feet. The rate of gain in water would accordingly be represented by the ratio $$\frac{w-a}{a}.$$

The rate of loss in air would be the inverse thereof, or $$\frac{a}{w-a}.$$

The time occupied by the sound in passing from the point of origin X to the point of incident Y is obviously composed of two elements; first the period which elapses between the two detonations, and, secondly, the period which the sound must have been traveling before the first detonation. Now, if the sound traveling through water reaches the point Y, a certain number of seconds, say, "$d$" before the sound reaches the point Y through air, then the sound would have traveled through air a total distance consisting, first, of "$d$" times "$a$", or "$da$", and secondly, the fraction of "$da$" represented by $$\frac{a}{w-a} \times da,$$

or the rate at which the sound in air had fallen behind the sound in water at the moment of the first detonation. Hence, the distance to be computed would equal "$da$", plus "$da$" multiplied by $$\frac{a}{w-a},$$

whence the formula.

The value of $d$ may be determined from the strip 12 in the manner previously indicated. The side XZ of the triangle XYZ may be determined in the same manner, and since the side YZ is known, the location of the point X may be readily determined.

It will be observed that while the distance of the point $x$ from the line YZ can be readily determined by the method above described, the method does not determine upon which side of the line $yz$ the point is located, and consequently it does not determine from which side the sound originates. To determine this, I provide two additional receivers 20 and 21, which may be located either in the air or in the water, on opposite sides of the line YZ.

In the drawings, I have shown the receivers located in the air, and at equal distances from the line YZ. The receivers may, however, be located at unequal distances from the line, but preferably at established points.

When sound originates on one side of the line YZ, it reaches the receiver 20 first and is indicated by the vibrations of an arm 22, which is actuated through the agency of an electric circuit, in which the receiver 20 is located, and a solenoid 23, located in the circuit. The solenoid 23 controls a diaphragm, which vibrates in response to vibrations of the diaphragm, forming a part of the receiver 20. When the sound originates on the other side of the line YZ, it reaches the receiver 21 first and is indicated by an arm 24, which is actuated through the agency of an electric circuit, in which the receiver 20 is located, and a solenoid 23, located in the circuit. The solenoid 23 controls a diaphragm, forming a part of the receiver 20. When the sound originates on the other side of the line YZ, it reaches the receiver 21 first and is indicated by an arm 24, which is actuated through the agency of a magnetically controlled diaphragm and a solenoid 25, located in the same electric circuit with the receiver 21. The arm 22 and 24 are provided with recording pens at their free ends and bear against the moving strip of paper 12. With this arrangement it can be easily determined from the strip upon which side of the line the sound originated.

I contemplate employing my invention on shipboard for the purpose of aiding in guiding the ship during foggy weather, or when it is impossible to employ visual signs. The receivers 3 and 4 may be located on the deck of the vessel, and the receivers 5 and 6 may be submerged in the water below the respective receivers 3 and 4. The receivers 20 and 21 are preferably located at each side of the vessel, or they may be extended from the two sides of the vessel by means of gaffs. In addition to using the apparatus on shipboard, it may be used along the coast for determining the position of vessels at sea, or it may be used either in the navy or the army for determining the position of guns or batteries which are in action.

In Fig. 2, I have shown a telephone receiver 26, which is located in the electric circuit with the receiver 6. The purpose of this instrument is to aid the observer in determining the nature of the sound effecting the receivers. Each sound to which the receivers are subjected will cause the recording arms to trace characteristic lines on the strip 12. A chart indicating the character of lines produced by various sounds may be provided for the purpose of aiding the observer in determining the character of the sound. This chart could be produced prior to installing the apparatus by subjecting it to different known sounds and then making a permanent record of the lines traced by the recording arms.

While the apparatus illustrated is adapted to be employed in connection with a source of vibratory impulses capable of emitting sound waves, it will be understood by those skilled in the art, that apparatus embodying my invention may also be employed in connection with a source which is capable of simultaneously emitting sound waves and Hertzian waves, or waves which are propagated in the ether, rather than the air. When such a source is employed, one or the other sets of receivers 3, 4, or 5, 6, will be so constructed that they will respond to the Hertzian waves. In other words, one or the other sets of receivers will be similar in construction to the receivers employed in wireless telegraphy installations. If the receivers 3 and 4 are so constructed that they are capable of receiving wireless messages, the receivers 5 and 6 will be located either in the air or in the water, and will be capable of responding to sound waves.

In accordance with the United States patent statutes, I have illustrated and described a form of apparatus embodying my invention, but I desire to have it understood that various changes, modifications and substitutions may be made in the apparatus illustrated, without departing from the spirit and scope of my invention as set forth by the appended claims.

What I claim is:—

1. A mechanism for determining the point of location of a source of sound comprising receivers located in pairs in the air and in the water and at known points, and means for recording the instant each receiver is affected by the sound from said source.

2. A mechanism for determining the point of location of a source of sound comprising receivers located at known points and in pairs in different transmitting media, electrically actuated means controlled by said receivers for recording the time of the reception of the sound by the receivers.

3. A mechanism for determining the point of location of a source of vibratory impulses imparted to two different media, comprising receivers located in pairs in the two media and at known points, one receiver of a pair being in one medium and the other being in the other medium, and means for recording the instant each receiver is affected by the vibrations from said source.

4. An apparatus for determining the relative location of a point of unknown location, with relation to two established points at the place of observation, comprising means, located at the point of unknown location, for emitting vibrations capable of propagating in two transmitting media, a series of receivers located at established points at the place of observation, at least one of said receivers being in one medium and the remainder being responsive to vibrations propagated in the other medium, and means controlled by the receivers for recording the time each receiver responds to vibrations emitted from said source.

HENRY J. FURBER, Jr.

Witnesses:
HENRY E. BEEBE,
WALTER F. MURRAY.